Aug. 30, 1932.  F. TYSON  1,874,718
FREEZING MECHANISM
Filed March 7, 1929  3 Sheets-Sheet 3

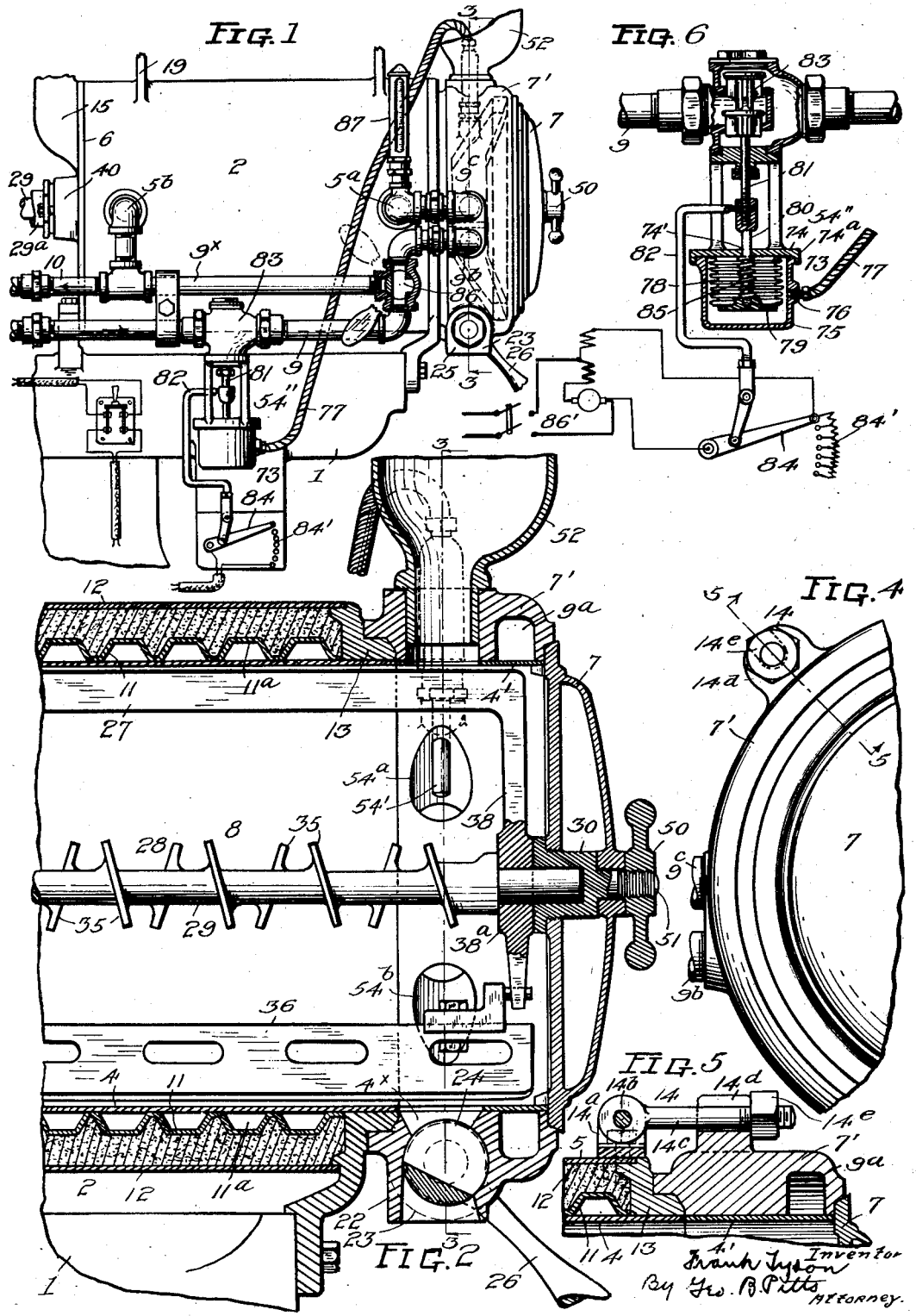

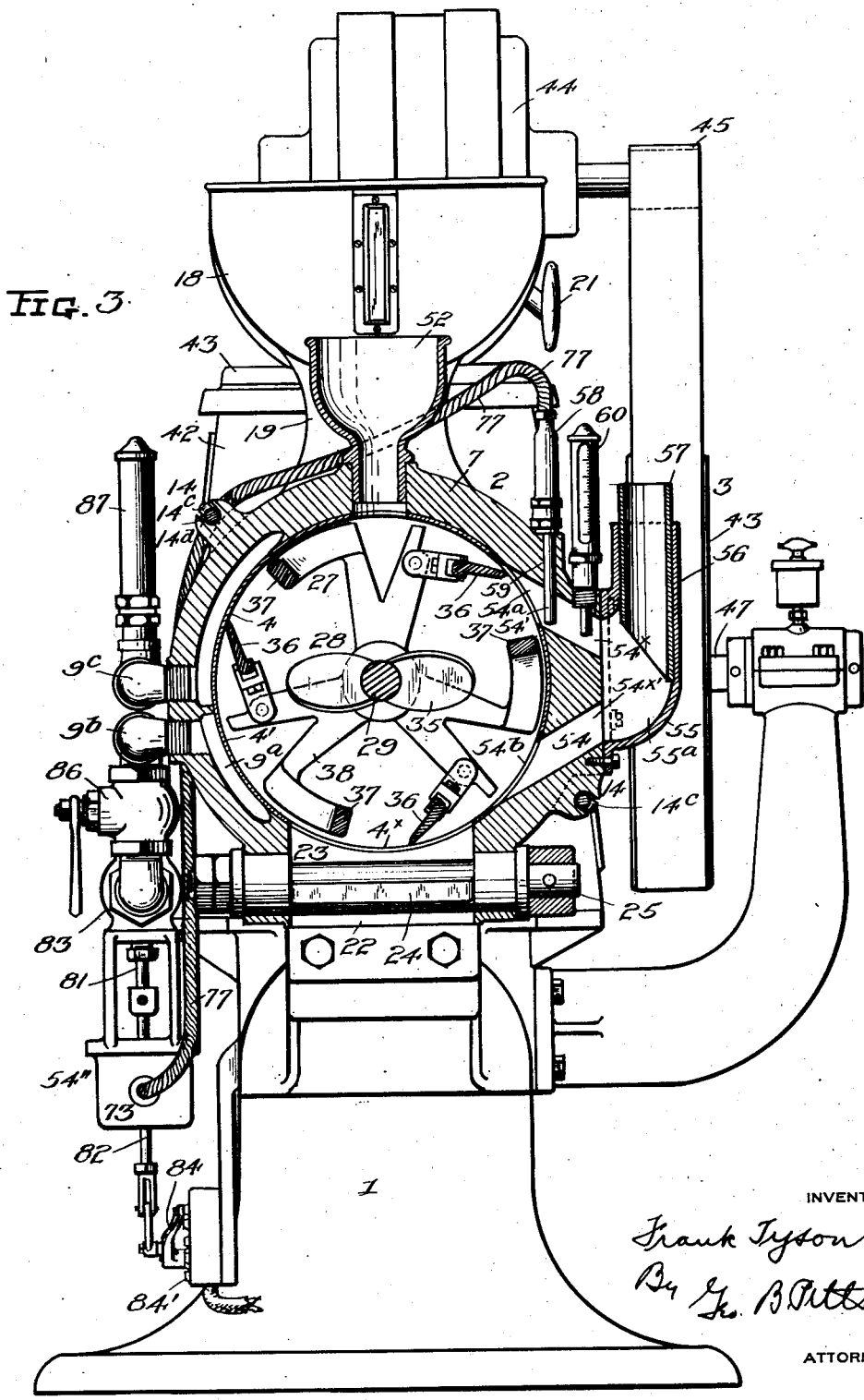

Patented Aug. 30, 1932

1,874,718

UNITED STATES PATENT OFFICE

FRANK TYSON, OF CANTON, OHIO

FREEZING MECHANISM

Application filed March 7, 1929. Serial No. 345,148.

This invention relates to a freezing mechanism, more particularly a mechanism for making materials, such as ice cream, ices and like products.

One object of the invention is to provide an extension for the freezing cylinder of a freezing mechanism, whereby its capacity or refrigerated surface or both may be increased in a ready manner.

Another object of the invention is to provide, in a freezing mechanism, means, dependent on the temperature of the material as it is being treated or operated upon, to control the speed of the driving means, whereby the speed of the treating means, for example, the agitating and scraping element or elements, varies as the temperature of the material changes.

Another object of the invention is to provide, in a material treating mechanism, means, dependent on the temperature of the material as it is being treated or operated upon, for controlling the supply of a temperature changing medium to the jacket of the material container, whereby the application of the medium to the wall of the container varies as the temperature of the material changes.

Another object of the invention is to provide an improved freezing mechanism whereby the speed of rotation of the elements, which act on the material within the freezing cylinder or the supply of the cooling medium to the jacket of the freezing cylinder, or both, is or are automatically controlled to insure uniformity of treatment of the successive batches of the material, whereby the same quality and character of frozen material results.

Another object of the invention is to provide an improved material treating mechanism having a conduit through which portions of the material flow as the treating operation continues, whereby its temperature may be (1) readily taken to indicate to the operator the condition of the material and (2) utilized to control the treating operation.

Another object of the invention is to provide an improved freezing mechanism of the type illustrated in my Letters Patent No. 1,645,782, dated October 13, 1927, and granted to me, but in which the construction is simplified and the conduit or separate chamber is so arranged that the operation of the agitating means serves to effect a flow of the material therethrough.

A further object of the invention is to provide an improved control means so constructed that it may be applied to freezing cylinders now in use in a ready manner.

Other objects of the invention will be apparent to those skilled in the art to which my invention relates from the following description, taken in connection with the accompanying drawings, wherein;

Fig. 1 is a side elevation of a freezing mechanism embodying my invention, parts being omitted.

Fig. 2 is a fragmentary longitudinal section of the mechanism.

Fig. 3 is a section on the line 3—3 of Figs. 1 and 2.

Fig. 4 is a fragmentary front elevation.

Fig. 5 is a section on the line 5—5 of Fig. 4.

Fig. 6 is a fragmentary section partly diagrammatic, showing in detail the controlling means for the valve in the temperature changing medium supply pipe and the lever for the rheostat in the circuit for the driving motor.

Figure 7:
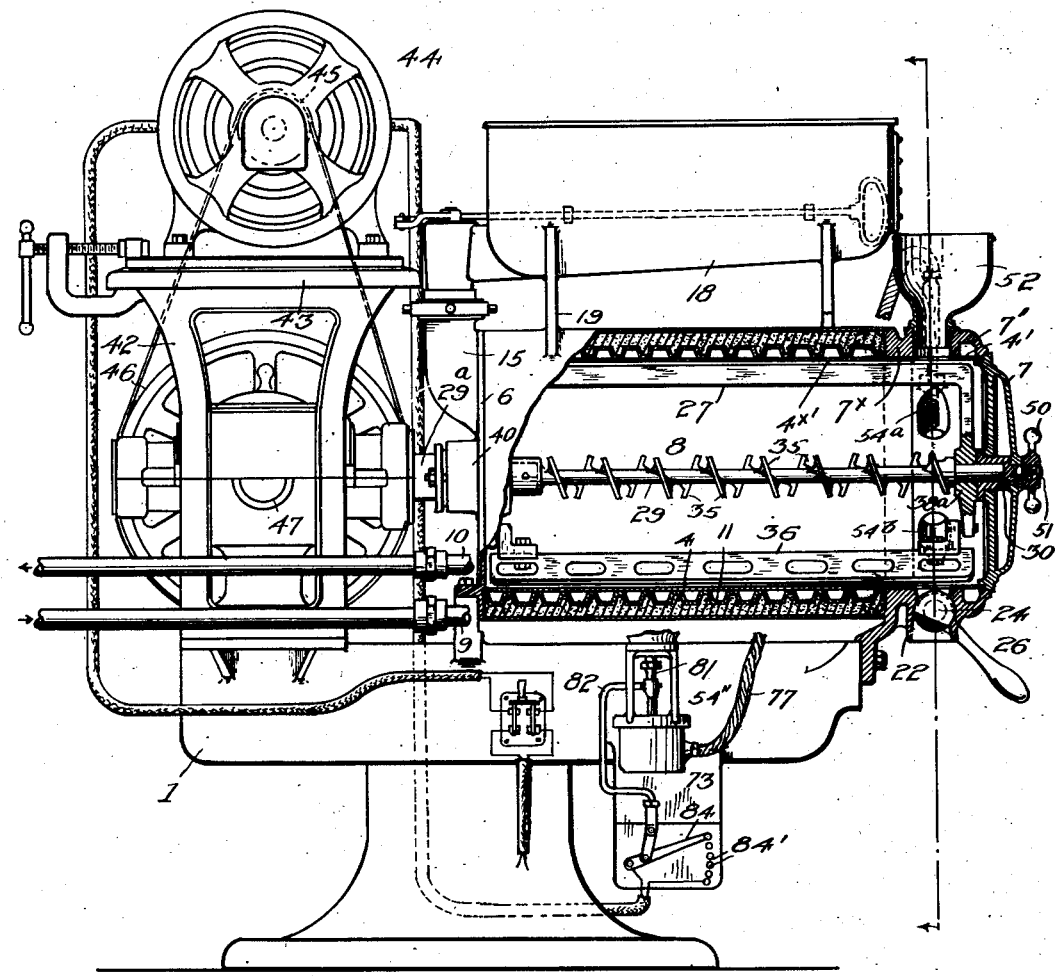
Fig. 7 is an elevation, with parts broken away, showing a modified form of construction.

In the drawings, 1 indicates a base or standard adapted to rest on the floor or other support, and fashioned to support in a rigid manner the freezing cylinder, indicated as an entirety at 2, and driving mechanism, indicated as an entirety at 3. If desired, the freezing cylinder 2 may be supported in the manner disclosed in Letters Patent No. 990,495, to Leroy S. Pfouts, dated April 25, 1911.

The cylinder 2 preferably comprises an inner cylinder 4, which serves as the container for the material, a jacket 5, a rear head 6, a front head 7, and means indicated at 8, within the inner cylinder for acting on the material to be treated or frozen. The jacket 5 is constructed to form a circuitous passage or conduit around the inner cylinder 4, from end to end thereof, for the temperature changing medium (brine being preferably used where the mechanism is to be used for freezing purposes), to effect change in temperature of the material therewithin, such passage or conduit having an inlet 5a and an outlet 5b, the former being connected with a supply pipe 9 and the latter being connected with a return or discharge pipe 10. The jacket 5 preferably comprises one or more metal sheets 11, having corrugations 11a, preferably secured to the outer surface of the inner cylinder 4 in the manner disclosed in Letters Patent No. 878,225 to John C. Miller, dated February 4, 1908, and a casing 12 surrounding the corrugated sheets 11. At their rear ends the cylinder 4 and casing 12 respectively engage the inner and outer walls of a circular rib provided on the inner face of the rear head 6, the rib serving to space the cylinder and casing ends in concentric relation and being secured thereto in a manner to prevent leakage from the inner cylinder through the head. 13 indicates a ring member fitting between and secured to the opposite or front ends of the inner cylinder 4 and casing 12. The outer surface of the ring member 13 is provided with (1) a seat with which the rim of an annular member 7′ (to be later described) engages and sets of devices 14 for removably clamping the annular member 7′ against its seat in a liquid tight manner. Each set of devices may consist of a bracket having a pair of lugs 14a supporting a pin 14b on which is pivoted a bolt 14c, the latter adapted to be positioned between lugs 14d carried by the annular member and clamped to the latter lugs by a nut 14e, but it will be understood that other forms of clamping devices, for example, such as shown in Letters Patent No. 945,570 to John C. Miller, may be used.

The freezing cylinder may be provided with one or more inlets and a valved discharge opening 4x, whereby the inner cylinder 4, may be filled with a batch or charge of material and emptied at the end of the treating operation.

In my present construction the inlet for fruit and certain other flavoring material and the valved discharge opening 4x may be formed in the annular member 7′, whereas the inlet for the material to be treated preferably comprises an opening formed in the head 6 connected to a valved conduit 15 leading from a batch holding tank 18. The valve for the conduit 15 has connected to it a handle 21, preferably extending to a point adjacent to the front end of the freezing cylinder. The valved discharge opening 4x preferably has associated with it a casing 22 integrally connected with said annular member and formed with an elongated passage 23 leading from the discharge opening 4x. The walls of the passage 23 are cut away to accommodate a valve 24, preferably of the rotary type, having trunnions 25, fitting openings in the end walls of the passage 23, whereby it may be oscillated to open or close the passage; one of the trunnions 25 being extended to provide a connection for a handle 26. The means 8 within the inner cylinder 4 for agitating the material therein, is preferably constructed and arranged to (1) agitate it, (2) scrape from the inner surface of the inner cylinder the films of material adhering thereto as the freezing continues, and (3) eject the material from the cylinder at the end of the freezing operation, whereby the material will be subjected to treatment to condition it into uniform consistency while being frozen in a relatively short period of time. The treating means preferably comprise outer and inner rotating members 27 and 28, respectively, the outer member operating near the outer portion of the cylinder 4 and the inner member operating in or about its central portion. The inner member 28 comprises a shaft 29, the front end of which is rotatably supported in a boss 30 formed in the front head 7. The rear end of the shaft 29 is extended through the rear head 6, as is the sleeve shaft 29a for the outer member 27, both shafts being connected to and driven in opposite directions by the driving mechanism 3. The shaft 29 is provided with a plurality of spaced blades or paddles 35, preferably disposed at an angle to an inclined plane cutting the axis of the shaft 29 so as to effect movement or flow of the material toward one end of the cylinder. By preference the shaft 29 is driven anti-clockwise (when looking at the front of the cylinder—see Fig. 3) and the blades 35 are arranged to move the material toward the rear end of the cylinder 4. The outer member comprises one or more scraping devices 36 and one or more ejecting devices 37 suitably supported at their opposite ends on spiders 38. The hub 38a (see Fig. 3) for the spider at the front end of the outer rotating devices 36, 37, is loosely mounted on the shaft 29. The hub for the spider at the rear end of the devices 36, 37, is connected to the sleeve 29a. The rear face of the head 6 is preferably provided with a wall surrounding the opening, whereby provision may be made for a suitable gland 40, around the sleeve shaft 29a. The ejecting device 37 is shown herein as a spirally twisted bar or a bar that is inclined to the axis of rotation and serves to propel the material toward the front end of the cylinder 4 and to effect its ejection through the discharge opening or passage 23 when the valve 24 therefor is open, but it will be obvious that other forms of ejecting devices may be substituted therefor.

The driving mechanism 3 includes a suitable support 42, having a base plate 43, carried at the rear end of the base or standard 1. 44 indicates a motor, preferably a variable speed electric motor, fixed to the base plate 43, the armature shaft of the motor carrying a sprocket 45 over which a drive chain runs to drive a sprocket 46. The sprocket 46 is fixed to a shaft 47, mounted in suitable bearings and drives a main gear which meshes with gears connected to the shafts 29 and 29a, respectively, whereby the latter are rotated in opposite directions.

The annular member 7' is mounted on the front end of the cylinder 2, as already set forth, so as to form a continuation or extension thereof being lined with a wall 4' which aligns with the cylinder 4. The outer rim of the member 7' is provided with a suitable ground seat with which the marginal edge of the front head 7 engages to form a liquid tight joint, the head being secured to the member 7 by a nut 50 engaging the extended threaded member 51 of the boss 30, as shown in Fig. 2. As shown, the wall 4' is cut away to provide the discharge opening 4x and permit the introduction of fruit through the inlet at the top, this inlet being preferably provided with a removable funnel 52. At one side, the annular member 7' is formed with a circulating chamber or passage 54 for the material being treated, so that the material or portions thereof will flow relative to and contact with an element 54' of a control mechanism 54'' to control the freezing operation as will later appear; the passage having an inlet 54a leading from the interior of the cylinder for the material and an outlet 54b leading thereinto. By preference, the passage 54 is provided on that side of the annular member 7' relative to which the scraping devices and ejecting devices move downwardly, so that these devices having the additional function during their revolving movement of forcing the material into the inlet of the passage and tend to suck it from its outlet.

As shown the passage 54 is in a plane at right angles to the axis of the cylinder 4, its inlet 54a in the upper portion of the cylinder and its outlet 54b in the lower portion thereof, so that the material entering the passage will have a tendency to flow therethrough by gravity before its viscosity increases due to freezing. By thus arranging the passage 54, I take advantage of the action of the agitating means and eliminate the provision of separate means for circulating the material through the passage. Due to the action of the agitating means 8, all portions of the material are thoroughly agitated and inter-mixed to effect a gradual and uniform treatment as freezing continues. During this progressive stage of freezing, portions of the material will be continuously forced through the passage 54 to effect automatic control of the driving means and brine supply as will later be set forth.

The passage 54 is preferably provided by forming in the wall of the annular member 7 an upper duct 54x and a lower duct 54x' and mounting on the side of the member, by means of bolts or cap screws, a fitting 55 having a chamber 55a which connects the outer ends of the ducts to form a continuous passage for the material. The fitting may have an upstanding pipe section 56 to permit visual inspection of the material and the section may be provided with a removable, hollow extension 57 to prevent spattering of the material.

For the purpose of refrigerating the inner wall 4' of the annular member 7', it is formed with a conduit 9a connected at its inlet end with the branch connection 9b connected with the supply pipe and connected at its outlet end with a piping 9c, which in turn is connected to the inlet 5a, as shown in Fig. 1. The conduit 9a extends around the annular member but is slightly inclined so as to provide for the discharge opening 23 and fruit inlet at its top. It will be noted, from Fig. 1, that the branch 9b and piping 9c (1) consist respectively of detachable fittings to permit removal and attachment of the annular member and (2) they are arranged so that they may be adapted to a standard type of freezing cylinder when my construction is to be applied thereto.

The wall of the annular member 7' may be provided with an opening in which is mounted a reading thermometer 60.

Of the control mechanism 54'', 73 indicates a casing preferably comprising a base member 74 having a rim 74a and a cup shaped member 75 having screw threaded connection with one side wall of the rim 74a to form a liquid or gas tight joint therewith. At 76, the wall of the cup shaped member 75 is formed with an opening in which is connected one end of a pipe (preferably a flexible pipe) 77. The opposite end of the pipe leads to and is connected to the element 54'. The element 54' preferably comprises a bulb adapted to hold a suitable liquid which vaporizes at a relatively low temperature, such as ether or a compound containing ether. I prefer to effect freezing of the material at or about a temperature of 24 degrees F. The bulb 54' extends downwardly into the conduit section 54x in the path of movement of the material from the cylinder, whereby the liquid in the bulb may be readily affected by changes in the temperature of the material. The bulb 54' is preferably supported in a socket 58, being secured in any well known way within an opening 59, formed in the wall of the member 7'. 78 indicates a diaphragm within the casing 73. The diaphragm preferably comprises a cylinder having annular corrugations that is expansible and compressible in the direction of its axis. The inner end of the diaphragm is secured in a well known manner to the base member 74; its outer end is secured to a cap 79, which is connected by a rod 80 to operating elements 81, 82, the former comprising a stem connected with a valve 83 in the supply 9 and the latter comprising an arm connected with the switch arm 84 of a rheostat 84' to control the supply of current to the motor 44. The rod 80 extends through an opening 74' formed in the base member 74, the walls of the opening serving as a guide for the rod. 85 indicates a spring preferably coiled around the rod 80 and bearing at its opposite ends against the inner or opposing faces of the base member 74 and cap 79, and normally tending to push the latter outwardly and hence expand the diaphragm 78 against the action or expansion due to the vaporization of the liquid in the bulb 54'. The rheostat is so constructed that relatively slight movement of the switch arm will affect the supply of current to the field of the motor 44, in order that the speed thereof may be quickly changed by the operation of the control mechanism 54''. The motor 44 herein illustrated by way of example is a variable speed motor using direct current and compound wound, so that its speed is increased by cutting resistance into the shunt winding in the field. Accordingly, as will be more evident from the description following, the switch arm is normally disposed at that end (hereinafter referred to as its "Off" position) of the rheostat 84' at which all the resistance is cut out and moves toward the opposite end (the "On" position) to cut in the resistance to effect increase in the motor speed.

86 indicates a valve interposed in the pipe 9. The valve 86 is preferably of the three-way type, so that the brine may be directed into the member 7' and jacket 5, or its flow entirely cut off, or cut off from the member 7' and directed through a supplemental pipe 9x to the return pipe 10.

Fig. 7 shows a modification of the invention in which the annular member and the ring member for the outer ends of the cylinders 11 and 12 are integrally formed as shown at 7x and inner cylinder 4x' extends to the outer end of the integral member.

The operation of the mechanism may now be described: at the time of starting the material in the bulb 54' being at room temperature, it will under normal conditions be vaporized and acting to compress the diaphragm, as shown in Fig. 6; accordingly, the valve 83 will be full open and the switch arm 84 at the "Off" position; as shown in Fig. 6. As the freezing continues, the temperature of the material in the cylinder 4 drops, thus permitting the vaporized material to liquefy, thereby reducing the pressure on the diaphragm 78 and allowing it to expand under the influence of the spring 85 and in turn move the rod 80 (downwardly, as shown in the drawings). The rod 80 in turn will move the valve 83 toward its seating position (cutting off the supply of brine) and the switch arm 84 toward its "On" position (cutting in resistance and increasing the speed of the motor). Likewise, if the temperature of the material rises, with resulting vaporization of the material in the bulb 54'', and compression of the diaphragm 78, these operations of the valve 83 and switch arm 84 will be in the reversed direction to simultaneously increase the supply of brine and decrease the speed of the motor. However, in starting, as first above described, the valve 86 will be positioned to cut off the brine to the member 7' and jacket 5 and the main switch 86' (see Fig. 6) for the motor circuit will be open. First, a batch of material is delivered to the batch tank 18, whereby the material may be measured. Next, the main switch 86' is closed and the valve 86 operated to admit the brine into the member 7' and jacket 5. Then the valve is opened to allow the material to flow from the batch tank into the cylinder 4. The freezing of the material then commences, the treating elements or devices 35, 36 and 37 serving to agitate the material, scrape those portions adhering to the inner surface of the cylinder 4 and propel the material through the passage 54, in which it flows past the bulb 54' into the cylinder 4, where it is again subjected to the action of the treating elements or devices 35, 36, and 37, such flow and action being continued and repeated on substantially all portions of the batch until the freezing operation is completed; whereupon the valve 24 will be operated to open the discharge port or opening 4x and permit the ejecting of the material. As the freezing of the material continues, its temperature will gradually fall or drop. If the temperature of the material drops or falls below the vaporizing temperature of the liquid in the bulb, such liquid will liquefy, and, by reason of the reduction of the pressure incident to the liquefying of the material and expansion of the spring 85, the latter will act to expand the diaphragm 78 which in turn will operate (1) the valve 83 to decrease the supply of the cooling medium and (2) the switch arm 84 to increase the speed of the motor 44, in the manner already set forth. If the temperature of the material continues to fall, the movements of the valve 83 and switch arm 84 will automatically continue until the brine is entirely cut off and the full motor speed is attained, unless, or until, the temperature of the material flowing through the conduit rises and thus effects an increase in the pressure on the diaphragm. If the temperature of the material flowing through the passage or conduit 54 past the bulb rises above the vaporizing temperature of the liquid in the bulb, then the vapor therein and in the pipe 77 will vaporize and hence effect an expansive force on the diaphragm, and thus effect movements of the valve 83 and switch arm 84 in the opposite direction, respectively.

From the foregoing description it will be seen that there is an operative relation between the supply of the cooling medium or brine and the speed of rotation of the motor 44 or the elements driven thereby, so that when the temperature of the material falls, which takes place as the material freezes, and hence becomes more viscous, the speed of the motor is increased accordingly and the supply of brine is decreased; on the other hand, when, or if, the temperature of the material rises, due to the decrease in the supply of the brine and its increased agitation and beating, the speed of rotation of the motor is decreased and the supply of brine is increased, in proportion to the rise in temperature. Accordingly, it will be seen that the speed of rotation of the material treating elements and the supply of brine will be simultaneously and automatically controlled by the temperature of the material in the freezing cylinder and one will be increased and the other decreased, or vice versa, to provide proper agitation and beating of the material in proportion to its viscosity and uniformity of such operations with successive batches of material.

87 indicates a thermometer, which may be provided in the supply pipe, preferably in the connection thereof with the inlet 5a, whereby the operative may ascertain the temperature of the brine at any time.

From the foregoing description it will also be seen that the annular member 7' may be readily applied to a freezer in actual use and that the proper connections between it and the pipes for the heat changing medium, and the inter-positioning of the valve in the pipe 9 may be effected in a simple manner, such application serving to provide the freezer with an automatic control means. Furthermore, such application serves to increase both the cubical capacity and area of the refrigerated surface of the cylinder. Where the annular member 7' is applied merely to increase the capacity or the refrigerated surface of the cylinder or both, the flow passage and the controlling devices are omitted.

When the annular member is applied to the cylinder, an agitating mechanism 8 that is long enough to occupy the space between is preferably substituted for the mechanism formerly used in the cylinder.

To those skilled in the art of making mechanisms of the class described, many alterations in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the class described, the combination of a cylinder having an inlet, a head for one end of said cylinder, an annular member mounted on the other end of said cylinder and formed with a flow passage having inlet and outlet openings leading through the wall of said member into said cylinder, a removable member for closing the outer end of said annular member, a valved discharge port provided in one of said members, and agitating mechanism within the space enclosed by said cylinder, head and members.

2. In apparatus of the class described, the combination of a cylinder having an inlet, a head for one end of said cylinder, an annular member mounted on the other end of said cylinder, a removable member for closing the outer end of said annular member, a valved discharge port provided in one of said members, agitating mechanism within the space enclosed by said cylinder, head and members, said annular member being formed with a passage having an inlet and an outlet communicating with the enclosed space and a conduit for a heat transfer medium, and supply and discharge pipes connected to said conduit.

3. In apparatus of the class described, the combination of a cylinder having an inlet, a head for one end of said cylinder, an annular member mounted on the other end of said cylinder and formed with a flow passage having inlet and outlet openings leading through the wall of said member into said cylinder, a removable member for closing the outer end of said annular member, a valved discharge port provided in one of said members, agitating mechanism within the space enclosed by said cylinder, head and members, and means for automatically controlling the operation of said agitating means, said means including an element extending into said passage and arranged to be engaged by the material flowing therethrough.

4. In apparatus of the class described, the combination of a cylinder having a closed head at one end, means surrounding said cylinder for applying a heat changing medium to said cylinder to change the temperature of the material during its treatment therein, said means having an inlet and outlet, a supply pipe, a discharge pipe for said outlet, an annular member removably mounted on the opposite end of said cylinder and forming an extension thereof and formed with an interior conduit having an inlet and an oulet for the heat changing medium, and detachable connections between said supply pipe and the inlet for said conduit and between the outlet for said conduit and the inlet for the medium applying means.

5. In apparatus of the class described, the combination of a receptacle for treating material having a material inlet and a valved discharge port, said receptacle comprising a horizontally disposed cylinder closed at its opposite ends and formed in its side wall with a conduit having an inlet opening disposed above a diametrical plane cutting the axis of said cylinder and leading therefrom and an outlet opening disposed below said plane and leading into said cylinder, and an agitating mechanism rotatable in said cylinder, said openings being formed on that side of the cylinder wall relative to which the outer elements of said agitating mechanism move downwardly.

6. In apparatus of the class described, the combination of a receptacle for treating material having a material inlet and a valved discharge port, means for agitating the material in said cylinder, means for effecting a change in temperature of the material during agitation thereof, a device for regulating one of said means, said receptacle comprising a horizontally disposed cylinder closed at its opposite ends and formed in its side wall with a conduit having an inlet opening disposed above a diametrical horizontal plane cutting the axis of said cylinder and leading therefrom and an outlet opening disposed below said plane and leading into said cylinder, said openings being formed in that side of said cylinder wall relative to which the outer elements of said agitating mechanism move downwardly, and means having an element in said conduit for contact with material flowing therethrough for controlling the operation of said device.

In testimony whereof, I have hereunto subscribed my name.

FRANK TYSON.